United States Patent
Oshima et al.

(10) Patent No.: US 7,848,215 B2
(45) Date of Patent: Dec. 7, 2010

(54) OPTICAL RECORDING MEDIUM, INFORMATION RECORDING APPARATUS AND INFORMATION REPRODUCTION APPARATUS

(75) Inventors: Seiro Oshima, Koufu (JP); Masataka Yamaguchi, Koufu (JP); Toshihiko Takishita, Koufu (JP); Takao Tagiri, Koufu (JP)

(73) Assignee: Pioneer Corporation, Tokyo-To (JP)

( * ) Notice: Subject to any disclaimer, the term of this patent is extended or adjusted under 35 U.S.C. 154(b) by 1293 days.

(21) Appl. No.: 11/387,947

(22) Filed: Mar. 24, 2006

(65) Prior Publication Data
US 2006/0256703 A1    Nov. 16, 2006

(30) Foreign Application Priority Data

Mar. 25, 2005 (JP) ............... P2005-089012
Mar. 25, 2005 (JP) ............... P2005-089013

(51) Int. Cl.
*B32B 3/02* (2006.01)
*G11B 7/24* (2006.01)
(52) U.S. Cl. ................. 369/275.1; 428/64.1
(58) Field of Classification Search .............. None
See application file for complete search history.

(56) References Cited

U.S. PATENT DOCUMENTS 7,037,565 B2 * 5/2006 Yamaguchi ............. 428/64.1
2004/0246869 A1 * 12/2004 Dierks ..................... 369/94

FOREIGN PATENT DOCUMENTS

| JP | 2003-141775 | * | 5/2003 |
| JP | 2004-079071 A | | 3/2004 |
| JP | 2005-062091 A | | 3/2005 |
| JP | 2006-127732 A | | 5/2006 |

OTHER PUBLICATIONS

Translation JP-2003-141775(May 2003).*
Translation JP-2004-079071(Mar. 2004).*
Japanese Patent Office Action dated Feb. 3, 2009.
Japanese Patent Office Action dated Jun. 9, 2009.

* cited by examiner

*Primary Examiner*—John A McPherson
*Assistant Examiner*—Anna L Verderame
(74) *Attorney, Agent, or Firm*—Sughrue Mion, PLLC

(57) ABSTRACT

An optical-recording medium is provided with at least a first recording layer for recording information optically; and a second recording layer for recording information optically by a light beam that passes through said first recording layer; wherein the track pitch of a recording track that is formed on said second recording layer is narrower than the track pitch of a recording track that is formed on said first recording layer.

2 Claims, 4 Drawing Sheets

MEMORY CAPACITY (GByte)

WHEN OFFSET=200μm AT r24mm, L0/L1 TP RATIO=1.001(0.1%)

WHEN OFFSET=116μm AT r24mm, L0/L1 TP RATIO=1.0028(0.28%)

WHEN OFFSET=105μm AT r24mm, L0/L1 TP RATIO=1.005(0.5%)

WHEN OFFSET=105μm AT r24mm, L0/L1 TP RATIO=1.01(1%)

OPTICAL RECORDING MEDIUM, INFORMATION RECORDING APPARATUS AND INFORMATION REPRODUCTION APPARATUS

BACKGROUND OF THE INVENTION

1. Field of the Invention

This invention relates to an optical-recording medium on which information can be recorded, an information-recording apparatus that can record information on that optical-recording medium, and an information-reproduction apparatus that can reproduce information from that optical-recording medium.

2. Related Art

Among optical-recording media such as CD-ROM (Compact Disc-Read Only Memory), CR-R (Compact Disc-Recordable), DVD-ROM, DVD-R and the like, development is being carried out for optical-recording media such as a multi-layer or dual-layer optical disc made by layering or applying a plurality of recording layers on top of the same substrate. Also, in an information-recording apparatus such as a DVD recorder that records on this kind of dual-layer type disc, or in other words, a two-layer type optical disc, by focusing a laser beam for recording on the recording layer (called the 'L0 layer' in this specification) that is located on the very front as seen from the irradiation side of the laser beam (in other words, the side near the optical pick up), information is recorded onto the L0 layer by adding heat or the like using a method such as an irreversible-change recording method or re-writable method, and by focusing that laser beam onto a recording layer (called the 'L1 layer' in this specification) that is located at the back side of the L0 layer as seen from the irradiation side of the laser beam (in other words, the side farthest from the optical pickup) by way of the L0 layer or the like, information is recorded onto the L1 layer by adding heat or the like using a method such as an irreversible-change recording method or re-writable method.

Also, in the case of a multi-layer optical disc, the L0 layer must let light pass through it, so the reflection film becomes an extremely thin film, however, the L1 layer must not let light pass through it, so in comparison with the L0 layer, there are no limits on the thickness of the reflection layer. By doing this, in the optical and thermal design, there is a disadvantage in that the margin of the L0 layer is narrow. Regardless of this, conventionally, recording has been performed on both layers using the same recording capacity, so differences occur in the recording characteristics of recording on the L0 layer and L1 layer, and particularly, this difference becomes an inconvenience the higher the linear velocity becomes.

For example, of the recording characteristics of each of the layers of a 2-layer DVD-R disc on which information has been recorded at 8× speed, the degree of modulation and the reflectivity are nearly the same, however, the jitter characteristic for the L0 layer is greater than 8%, whereas, for the L1 layer, it is 7%, which is 1% less than the standard 8% for a DVD disc. Therefore, conventionally, in the case of recording on a multi-layer optical disc at high linear velocity, as in the invention disclosed in Reference 1, there is a method for changing the recording capacity for the L0 layer and L1 layer. More specifically, without changing the overall recording capacity of the entire optical disc, the recording capacity of the L1 layer, which has more leeway in the recording characteristics, is increased, and the recording capacity of the L0 layer is decreased, so that the jitter characteristic is about the same for each layer. (Reference 1: Japanese Laid Open Patent Application No. 2001-14677)

Also, in the case of a 2-layer DVD-R disc, when recording information onto the L1 layer, information must have been recorded at the same radial location of the L0 layer as the L1 layer being recorded on. This is because, when recording on the L1 layer in any part where information is not recorded at the same radial location on the L0 layer, the recording sensitivity of the L1 layer will change due to changes in the transmittance of the L0 layer below it, and thus variations in recording characteristics occur. However, since bonding misalignment and eccentricity occur in the optical disc, when recording information onto the L1 layer starting from the same address where information has already been recorded on the L0 layer, there is an inconvenience in that information will be recorded on the L1 layer in a location where information is not recorded on the L0 layer. Therefore, in order to comply with DVD standards, the address position on the L1 layer that corresponds to the same address on the L0 layer is offset about 105 μm further on the inside than the position on the L0 layer, and the inconvenience due to bonding misalignment and eccentricity is avoided. (Reference 2: Japanese Laid Open Patent Application No. 2000-311346) (Reference 3: Japanese Laid Open Patent Application No. 2001-23237)

In order to make the jitter characteristic of each layer of the optical disc about the same without changing the overall recording capacity of the entire optical disc by increasing the recording capacity of the L1 layer and decreasing the recording capacity of the L0 layer as in the aforementioned case of the invention disclosed in Reference 1, there are two methods; or more specifically, a method of changing the linear velocity for each layer without changing the transfer rate; or a method of changing the transfer rate for each layer without changing the linear velocity.

In both of these two methods, either the linear velocity must be changed or the transfer rate must be changed, so there is an inconvenience in that it is necessary to change the control system of the recording apparatus.

Also, a DVD is recorded at CLV (Constant Linear Velocity), so compared with the outer circumference, a longer radial distance is covered on the inner circumference in order move over the same address. Therefore, in order to reach an address position on the L1 layer that is the same as an address position on the L0 layer, it is necessary in the case of the L1 layer to move further toward the inside than in the case of the L0 layer, so by offsetting the address position 105 μm on the outer side, the amount of offset on the inner side becomes about 260 μm, so there is no space on the inner side for an area for OPC (Optical Power Control), or for an area for recording RMD (Recording Management Data). A method is feasible in which the drive calculates the relationship between the address and radius by referencing a data table, however, there is an inconvenience in that the operation becomes more complicated.

SUMMARY OF THE INVENTION

Taking the aforementioned inconveniences into consideration, the object of the present invention is to provide an optical-recording medium that is capable of making the jitter characteristic of each layer about the same without having to change the control system of the recording apparatus, and to provide an information-recording apparatus and information-reproduction apparatus that use that medium.

Also, another object of the present invention is to provide an optical-recording medium that is capable of reducing deviation in the relative positional relationship on the inner circumferential side between a plurality of recording layers, and to provide an information-recording apparatus and information-reproduction apparatus that use that medium.

The above object of the present invention can be achieved by a optical-recording medium of the present invention. The optical-recording medium is provided with at least a first recording layer for recording information optically; and a second recording layer for recording information optically by a light beam that passes through said first recording layer; wherein the track pitch of a recording track that is formed on said second recording layer is narrower than the track pitch of a recording track that is formed on said first recording layer.

According to the present invention, by making the track pitch of the second recording track narrower than the track pitch of the first recording track without changing the linear velocity or transfer rate of the first recording layer and second recording, and without changing the overall recording capacity of the entire optical disc, it becomes possible to improve the jitter characteristic of the first recording layer during recording at high linear velocity, and to match the recording characteristics of both the first recording layer and second recording layer. By doing so, it is not necessary to change the control system of the recording apparatus, and it is possible to make the jitter characteristic of each layer about the same.

In one aspect of the present invention can be achieved by an information-recording apparatus of the present invention. The information-recording apparatus of the present invention is provided with:

the optical-recording medium of the present invention; a rotation-drive device which rotates said optical-recording medium at a predetermined revolutions per minutes that is capable of corresponding to the ratio between the track pitch of said first recording layer and the track pitch of said second recording layer; and a recording device which records information by irradiating a light beam on said rotating optic-recording medium.

According to the present invention, by having the spindle motor rotate at an rpm that corresponds to the ratio between the track pitch of the first recording track and the track pitch of the second track, irradiating a laser beam onto the optical disc, and recording information, it is possible to make the jitter characteristic of the first recording layer and the second recording layer about the same, and to record at a speed that is 4× the normal linear velocity or greater.

In another aspect of the present invention can be achieved by an information-reproduction apparatus of the present invention. The information-reproduction apparatus is provided with: the optical-recording medium of the present invention; a rotation-drive device which rotates said optical-recording medium at a predetermined revolutions per minutes that is capable of corresponding to the ratio between the track pitch of said first recording layer and the track pitch of said second recording layer; and a reproduction device which reproduces information recorded on said optical-recording medium by irradiating a light beam on said rotating optic-recording medium.

According to the present invention, by having the spindle motor rotate at an rpm that corresponds to the ratio between the track pitch of the first recording track and the track pitch of the second track, irradiating a laser beam onto the optical disc, and reproducing information, it is possible to make the jitter characteristic of the first recording layer and the second recording layer about the same, and to reproduce at a speed that is 4× the normal linear velocity or greater.

The above object of the present invention can be achieved by a optical-recording medium of the present invention. The optical-recording medium is provided with: at least a first recording layer for recording information optically; and a second recording layer for recording said information optically by a light beam that passes through said first recording layer; wherein when said information is recorded on said first recording layer and second recording layer at a constant linear velocity, and an address position that mutually corresponds to both said first recording layer and said second recording layer is such that the address position on said second recording layer is relatively offset so it is further inside than the address position on said first recording layer, the track pitch of a recording track formed on said second recording layer is narrower than the track pitch of a recording track formed on said first recording layer so that the overall offset value in the radial direction is a predetermined value or less.

According to the present invention, the optic disc is based on the relative positional relationship between each address position and radius on the first recording layer and second recording, the address positions on the first recording layer and second recording layer are relatively offset, and by making the track pitch of the second recording track narrower than the track pitch of the first recording track so that the overall offset value in the radial direction is a predetermined value, it is possible to reduce deviation in the relative positional relationship between the addresses and radius on the first recording layer and second recording layer. As a result, it is possible to have extra space for the OPC area and area for recording RMD.

In one aspect of the present invention can be achieved by an information-recording apparatus of the present invention. The information-recording apparatus of the present invention that records information optically on the optical-recording medium of the present invention, is provided with: an irradiation device which irradiates said light beam on either a recording track formed on said first recording layer or a recording track formed on said second recording layer; a rotation-drive device which rotates said optical-recording medium at a predetermined revolutions per minutes; and a recording-control device which controls recording on said rotating optical-recording medium by said light beam.

According to the present invention, it is possible to greatly reduce the deviation in the relative positional relationship between an address and radius on the first recording layer and second recording layer.

In another aspect of the present invention can be achieved by an information-reproduction apparatus of the present invention. The information-reproduction apparatus of the present invention that reproduces information optically from the optical-recording medium of the present invention, is provided with: an irradiation device which irradiates said light beam on either a recording track formed on said first recording layer or a recording track formed on said second recording layer; a rotation-drive device which rotates said optical-recording medium at a specified rpm; and a reproduction device which reproduces information recorded on said rotating optical-recording medium by receiving said light beam that is reflected from said rotating optical-recording medium.

According to the present invention, it is possible to greatly reduce the deviation in the relative positional relationship between an address and radius on the first recording layer and second recording layer.

DESCRIPTION OF THE PREFERRED EMBODIMENTS

Embodiment 1

Figure 1:
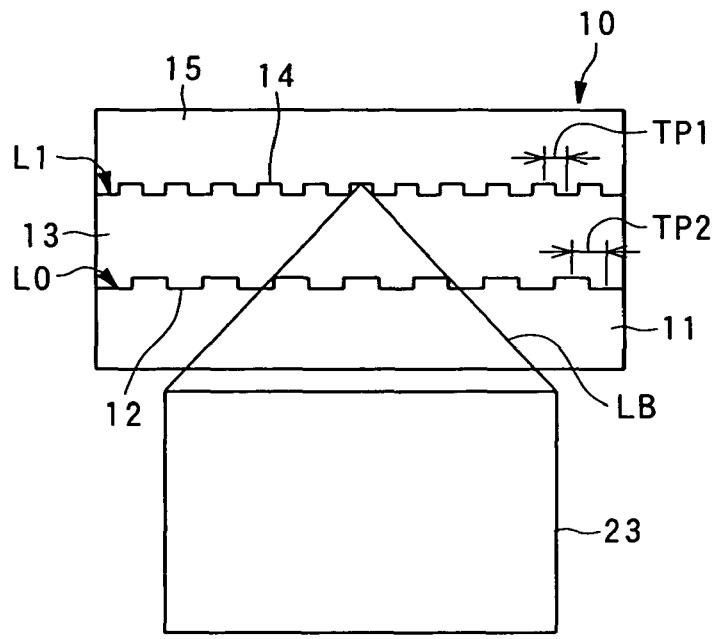
FIG. 1 is a cross-sectional drawing showing the optical-recording medium of a first embodiment of the invention.

The optical-recording medium of a first embodiment of the invention will be explained below based on the drawings. FIG. 1 is a cross-sectional drawing showing the optical-recording medium of a first embodiment of the invention. In this embodiment, the optical disc has two layers on one surface (in other words is a dual-layer disc), and the case of a DVD-R disc that is capable of recording at 4× speed or greater is explained.

As shown in FIG. 1, the optical disc 10 used as the optical-recording medium comprises: a cover layer 11; a first recording layer L0 (recording layer that is on the side nearest to the optical pickup) on which a first recording track 12 for recording information is formed; an intermediate layer 13; a second recording layer L1 (recording layer on the far side from the optical pickup) on which a second recording track 14 for recording information via the first recording layer L0 is formed; and a PC (polycarbonate) substrate 15 that are layered in that order from the side of the irradiation surface of the laser beam LB. Also, when recording on or reproducing from the optical disc 10, recording on or reproduction from the first recording layer L0, or recording on or reproduction from the second recording layer L1 is performed depending on whether the position where the laser beam LB that is irradiated from the bottom side toward the top side is focused is lined up with a recording position on the first recording layer L0 or second recording layer L1.

Moreover, the optical disc 10 of this embodiment is an optical disc that is capable of recording at a speed of 4× the normal linear velocity (1×) of 3.84 m/s for a DVD-R dual disc, and where the track pitch TP2 of the second recording track 14 is narrower than the track pitch TP1 of the first recording track 12. Here, the track pitch is defined as the interval in the radial direction of the first or second recording track 12, 14 of the optical disc 10 (the unit, for example, is μm/track).

Figure 2:
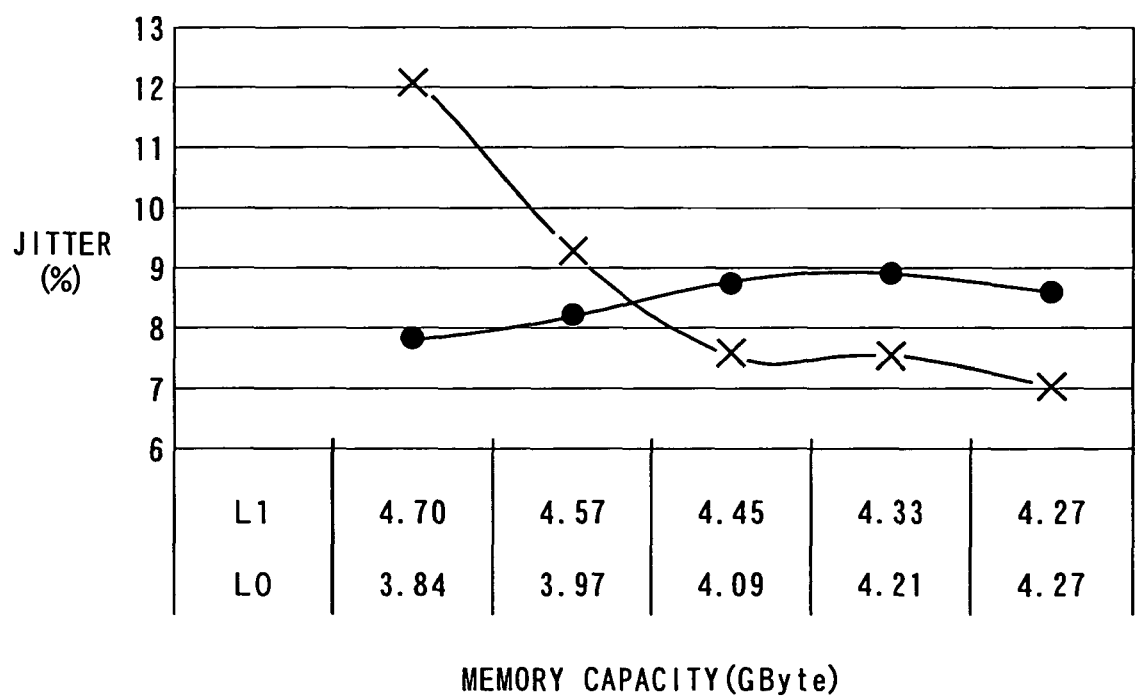
FIG. 2 is a graph showing the jitter characteristics when changing the recording capacity of a first recording layer and second recording layer in the first embodiment of the invention.

FIG. 2 shows the jitter characteristics for recording on each layer of a 2-layer DVD-R disc at 8× speed in the case where the recording capacity for the first recording layer L0 and the second recording layer L1 has changed. In other words, FIG. 2 is actual measurement data for the jitter characteristics for each layer when recording is performed at 8× speed in the case where the recording capacity of the second recording layer L1 is increased and the recording capacity of the first recording layer L0 is decreased.

According to FIG. 2, the jitter characteristic for the second recording layer L1 becomes worse as the recording capacity increases, however, the jitter characteristic remains level at about 7% up until the recording capacity has been increased to about 4.5 GB. Also, there is a tendency for the jitter characteristic of the first recording layer L0 to improve as the recording capacity is decreased, and it is seen that by decreasing the recording capacity up to about 4.0 GB from the conventional 4.27 GB, a jitter characteristic having a value of about 7% is obtained. Therefore, according to FIG. 2, even when the recording capacity of the second recording layer L1 is increased to 4.45 to 4.57 GB, a value close to 8% is obtained, and by decreasing the recording capacity of the first recording layer L0 to 4.09 to 3.97 GB, a value near 8% is obtained.

The 2-layer type optical disc 10 is constructed as described above, so when recording on or reproducing from the optical disc 10, the optical pickup 23 of the information-recording/reproduction apparatus (described later) irradiates a light beam, which is a laser beam LB, from the side of the cover layer 11, or in other words, from the bottom side in FIG. 1 toward the top side, and controls the focal distance of that laser beam LB, as well as controls the distance and direction moved in the radial direction of the optical disc 10. By doing this, data is recorded on or reproduced from the respective recording layers.

In this way, with this embodiment, by making the track pitch TP2 of the second recording track 14 narrower than the track pitch TP1 of the first recording track 12 without changing the linear velocity or transfer rate of the first recording layer L0 and second recording layer L1, and without changing the overall recording capacity of the entire optical disc 10, it becomes possible to improve the jitter characteristic of the first recording layer L0 during recording at high linear velocity, and to match the recording characteristics of both the first recording layer L0 and second recording layer L1. By doing so, it is not necessary to change the control system of the recording apparatus, and it is possible to make the jitter characteristic of each layer about the same.

Figure 3:
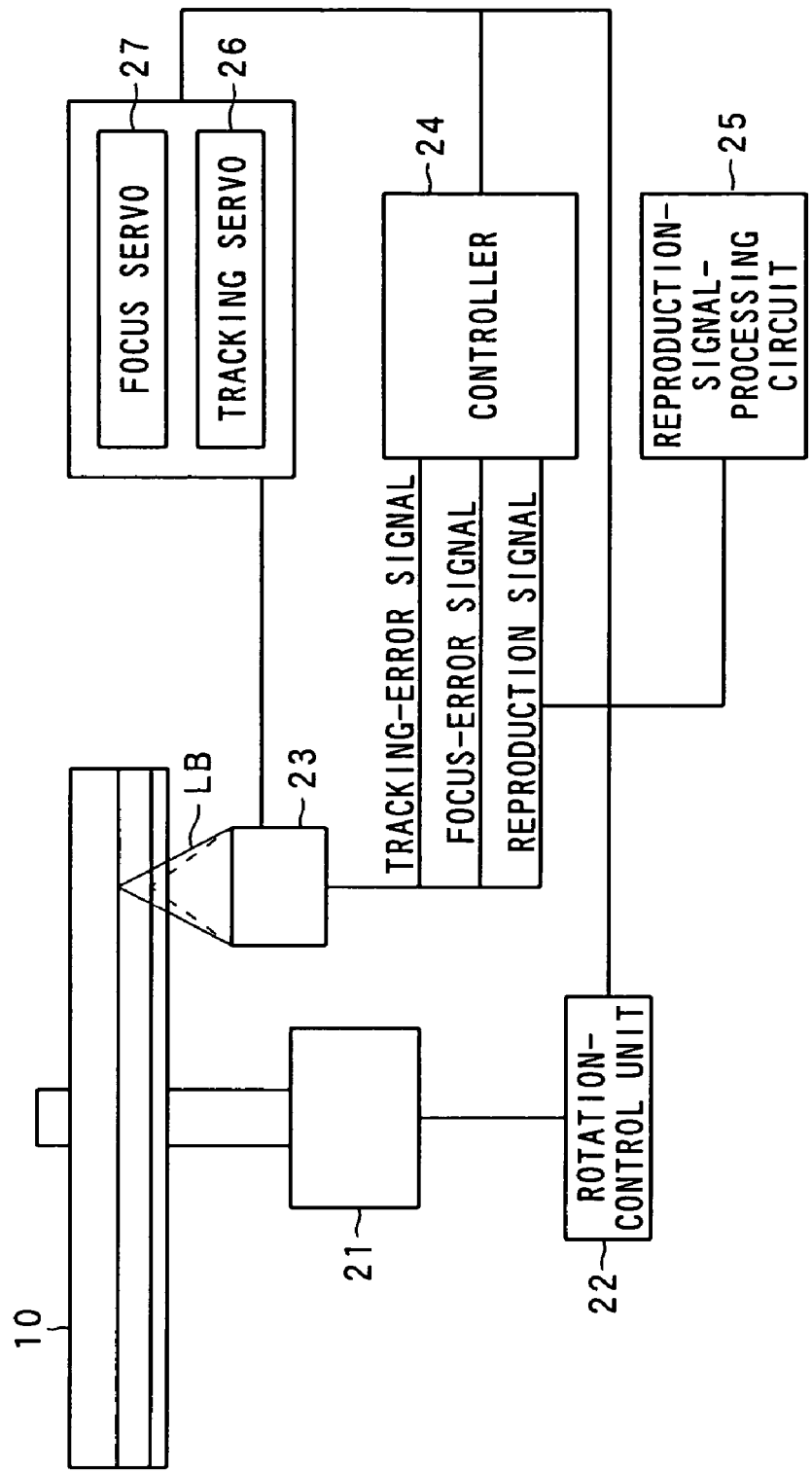
FIG. 3 is a drawing showing the construction of the information-recording apparatus of a first and second embodiment to which the invention has been applied.

Next, the case of recording information on or reproducing information from the optical-recording medium that is constructed as described above using an information-recording/reproduction apparatus 20 as shown in FIG. 3 will be explained. In other words, the information-recording/reproduction apparatus 20 is an apparatus that records information on an optical disc 10 or reproduces information that has been recorded on an optical disc 10 according to control from a controller 24.

As shown in FIG. 3, in the information-recording/reproduction apparatus 20, the optical disc is rotated at a specified speed by a spindle motor 21 that functions as a rotation-drive unit. This spindle motor 21 is driven by a rotation-control unit 22 (described later) and rotates the optical disc 10 at a specified rpm.

Also, a laser beam LB, whose intensity is controlled by the optical pickup 23 of the information-recording/reproduction apparatus 20, is shone onto the optical disc 10. The laser beam LB that is reflected by the optical disc 10 is then shone onto the light-detection unit (not shown in the figure) of the optical pickup 23. This light-detection unit is constructed so that it uses a split-light detector, and generates a focus-error signal, tracking-error signal, and when performing reproduction, a reproduction signal from the reflected laser beam LB described above using photoelectric conversion and current-voltage conversion. The aforementioned focus-error signal, tracking-error signal and reproduction signal are supplied to the controller 24 that performs overall control of the information-recording/reproduction apparatus 20. The reproduction signal is also supplied to a reproduction-signal-processing circuit 25 that reproduces the signal.

The controller 24 generates a tracking-control signal for controlling the objective lens (not shown in the figure) of the optical pickup 23 based on the supplied tracking signal, and supplies that signal to a tracking servo 26.

This tracking servo 26 drives the objective lens of the optical pickup 23 according to the supplied tracking-control signal, and the laser beam LB is shone on the first recording track 12 or second recording track 14.

Also, based on the focus-error signal, the controller 24 generates a focus-control signal for controlling the objective lens of the optical pickup so that the focus position of the laser beam LB is located at a desired position on the first recording layer L0 or second recording layer L1, and supplies that signal to a focus servo 27.

Based on address information that is recorded in a pre pit that is read from the tracking-error signal, the controller 24 generates a focus-control signal for controlling the objective lens of the optical pickup 23 so that the focus position of the laser beam LB changes from the first recording layer L0 to the second recording layer L1, or from the second recording layer L1 to the first recording layer L0, and outputs that signal to the focus servo 27.

This focus servo 27 drives the objective lens of the optical pickup according to the focus-control signal that is output, and controls the focus position of the laser beam LB so that it is located at a position on the desired recording layer L0 or L1.

Also, the controller 24 generates a rotation-control signal for controlling the spindle motor 21 and outputs it to the rotation-control unit 22. This rotation-control unit 22 drives the spindle motor 21 according to the rotation-control signal that is output, and controls the rpm of the optical disc 10 so that it is at a specified rpm.

Here, in this embodiment, by having the spindle motor 21 rotate at an rpm that corresponds to the ratio between the track pitch TP1 of the first recording track 12 and the track pitch TP2 of the second track 14, irradiating a laser beam LB onto the optical disc 10, and recording information, it is possible to make the jitter characteristic of the first recording layer L0 and the second recording layer L1 about the same, and to record at a speed that is 4× the normal linear velocity or greater.

Also, by having the spindle motor 21 rotate at an rpm that corresponds to the ratio between the track pitch TP1 of the first recording track 12 and the track pitch TP2 of the second track 14, irradiating a laser beam LB onto the optical disc 10, and reproducing information, it is possible to make the jitter characteristic of the first recording layer L0 and the second recording layer L1 about the same, and to reproduce at a speed that is 4× the normal linear velocity or greater.

The invention is not limited to the embodiment described above, and various changes are possible. For example, the optical disc 10 of this invention is not limited to two layers on one surface, or in other words, a dual-layer disc, and it possible for the optical disc 10 to have two layers on both surfaces, or in other words, a dual-layer double-sided disc. Also, the invention is not limited to an optical disc having two recording layers as described above, and the optical disc could also be a multi-layer disc having three or more layers. In the case of three or more layers, the relationship between the farthest recording layer that is the farthest from the irradiation surface of the laser beam LB and the recording surfaces other than the farthest recording surface that are on the side of the irradiation surface can be the same as the relationship between the second recording layer L1 and the first recording layer L0 described above. As a result, it is possible to increase the applicable range for applying the present invention to an optical disc. Also, the invention can be applied to a large-capacity recording medium such as a disc that uses a blue laser in recording or reproduction.

Furthermore, in the embodiment described above, the case of performing recording or reproduction at a speed of 4× or greater, particularly 8×, is explained, however, the invention could also be applied to the case in which recording or reproduction is performed at a speed of 16×. By doing so, it is possible to increase the applicable range for applying the present invention to an optical disc.

Embodiment 2

The optical-recording medium of a second embodiment of the invention will be explained below based on the drawings. In the embodiment described below, the case of applying the invention to a DVD-R disc as an optical disc having two layers on one side (dual-layer disc) will be explained.

Embodiment of the Optical-recording Medium

FIG. 1 is a cross-sectional drawing showing the optical-recording medium of an embodiment of the invention.

The optical disc 10 of this embodiment is an optical disc on which information is recorded on the first recording layer L0 and second recording layer L1 at a constant linear velocity, and based on the relative positional relationship between each address position and radius on the first recording layer L0 and second recording layer L1, there is offset between the first recording layer L0 and second recording layer L1 in order to comply with DVD standards. In other words, the address position on the second recording layer L1 that correspond to the same address position on the first recording layer L0 is relatively offset.

Furthermore, the optical disc 10 is such that the ratio of the track pitch TP2 of the second recording track 14 with respect to the track pitch TP1 of the first recording track 12 (TP1/TP2) is greater than 1. In other words, the optical disc 10 is such that track pitch TP2 of the second recording track 14 is narrower than the track pitch TP1 of the first recording track 12 so that the overall offset value in the radial direction is within a specified range. Here, the track pitch is defined as the interval of the first or second recording track 12, 14 in the radial direction of the optical disc 10 (the unit, for example, is μm/track). Moreover, the specified value referred to above is 200 μm or less, as will be described later.

The 2-layer type optical disc 10 is constructed as described above, so when recording information on or reproducing information from the optical disc 10, the optical pickup 23 that functions as an irradiation unit of the information-recording/reproduction (described later) irradiates a light beam, which is a laser beam LB, from the side of the cover layer 11, or in other words, from the bottom in FIG. 1 toward the top, and controls the focal distance together with the distance and direction of movement in the radial direction of the optical disc 10. By doing this, data is recorded on the respective recording layers, or recorded data is reproduced.

The optic disc 10 of this embodiment is an optical disc on which, based on the relative positional relationship between each address position and radius on the first recording layer L0 and second recording L1, the address positions on the first recording layer L0 and second recording layer L1 are relatively offset, and by making the track pitch TP2 of the second recording track 14 narrower than the track pitch TP1 of the first recording track 12 so that the overall offset value in the radial direction is 200 μm or less, it is possible to reduce deviation in the relative positional relationship between the addresses and radius on the first recording layer L0 and second recording layer L1. As a result, it is possible to have extra space for the OPC area and area for recording RMD.

Embodiment Example

Next, FIG. 4 to FIG. 7 will be used to explain an example of comparing the deviation in the relative positional relationship between the radius and address of the first recording layer L0 and second recording layer L1 for the case when the track pitch ratio TP1/TP2 is not changed (TR ratio of 1 is indicated by the dashed line), and the case when a % of difference is applied (indicated by the solid line).

Figure 4:
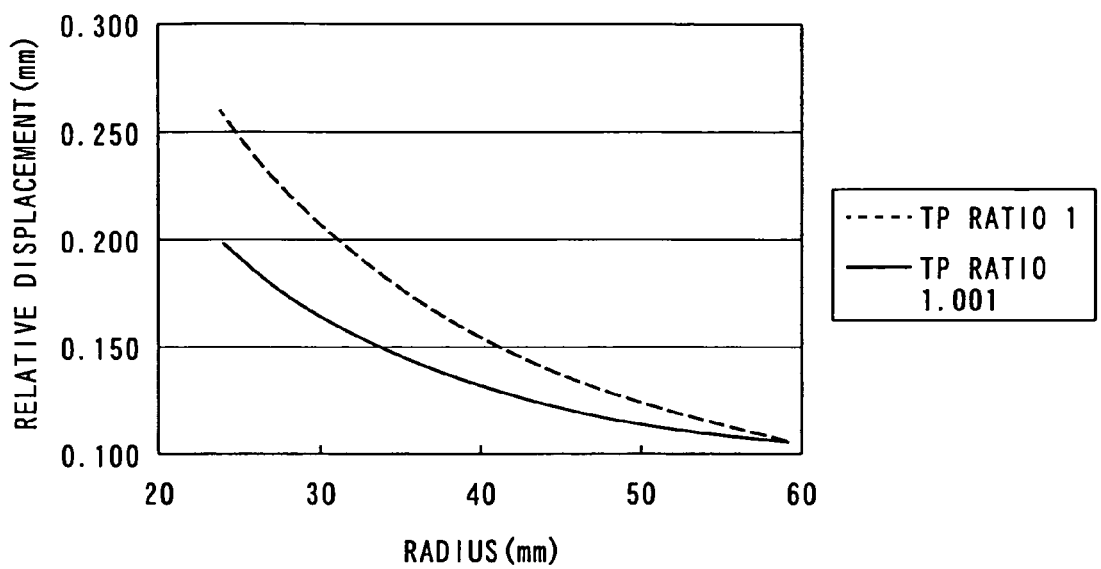
FIG. 4 is a graph showing deviation in the relative positional relationship between a first and second recording layer at a certain track pitch ratio and radius in a second embodiment of the invention.

FIG. 4 shows the case of an offset amount of 200 μm at a position where the radius r is 24 mm, and where a difference in track-pitch ratio of 0.1% is applied. From FIG. 4 it can be seen that when comparing the case shown by the dashed line where the track-pitch ratio (TP1/TP2) is not changed with the case shown by the solid line where the track-pitch ratio of the second recording layer L1 with respect to the first recording layer L0 is made more narrow by 0.1%, in the case where the track-pitch ratio has been made more narrow by 0.1%, the relative displacement on the inner side becomes a low 200 μm, and it is possible to reduce the deviation in the relative positional relationship between the address and radius on the first recording layer L0 and second recording layer L1. Here, the aforementioned offset amount of 200 μm is a 200 μm offset toward the inner side of the address position on the second recording layer L1 that corresponds to the same address on the first recording layer L0.

Figure 5:
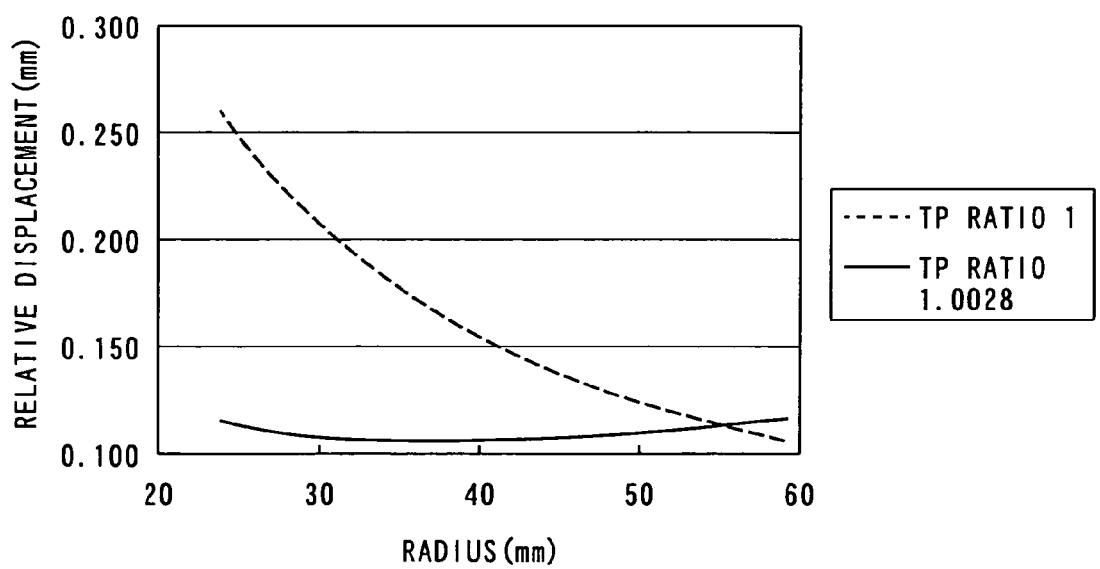
FIG. 5 is a graph showing deviation in the relative-positional relationship between a first and second recording layer at a certain track pitch ratio and radius in a second embodiment of the invention.

FIG. 5 shows the case of an offset amount of 116 μm at a position where the radius r is 24 mm, and where a difference in track-pitch ratio of 0.28% is applied. From FIG. 5 it can be seen that when comparing the case shown by the dashed line where the track-pitch ratio (TP1/TP2) is not changed with the case shown by the solid line where the track-pitch ratio of the second recording layer L1 with respect to the first recording layer L0 is made narrower by 0.28%, in the case where the track-pitch ratio has been made narrower by 0.28%, the relative displacement on both the inner side and outer side becomes dramatically low, and it is possible to greatly reduce the deviation in the relative positional relationship between the address and radius on the first recording layer L0 and second recording layer L1.

Figure 6:
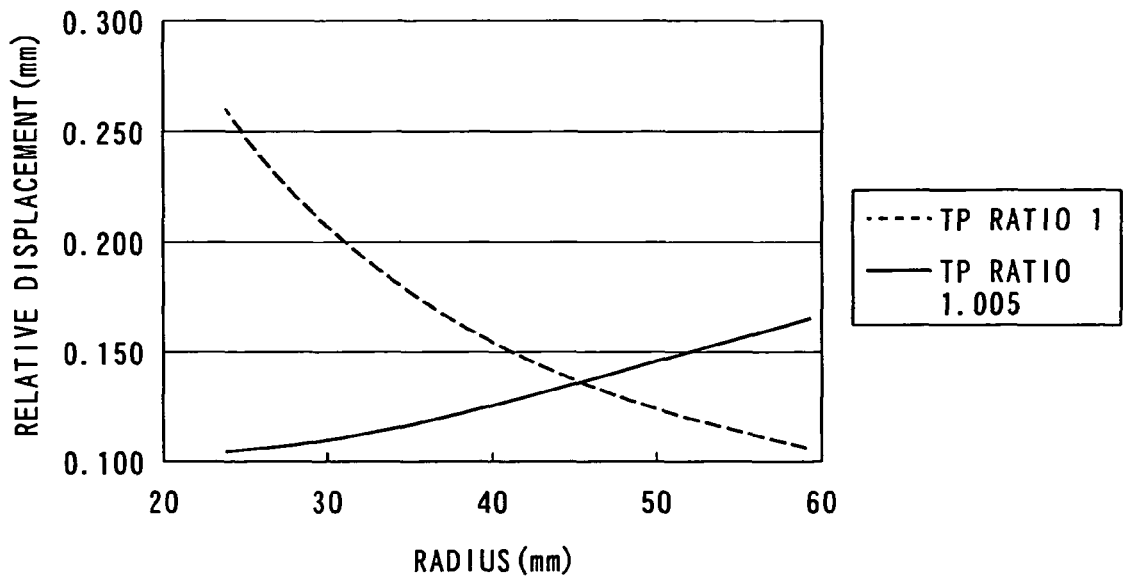
FIG. 6 is a graph showing deviation in the relative-positional relationship between a first and second recording layer at a certain track pitch ratio and radius in a second embodiment of the invention.

FIG. 6 shows the case of an offset amount of 105 μm at a position where the radius r is 24 mm, and where a difference in track-pitch ratio of 0.5% is applied. From FIG. 6 it can be seen that when comparing the case shown by the dashed line where the track-pitch ratio (TP1/TP2) is not changed with the case shown by the solid line where the track-pitch ratio of the second recording layer L1 with respect to the first recording layer L0 is made narrower by 0.5%, in the case where the track-pitch ratio has been made narrower by 0.5%, the relative displacement on the outer side increases a little, and the relative displacement on the inner side becomes low, and it is possible to reduce the deviation in the relative positional relationship between the address and radius on the first recording layer L0 and second recording layer L1. In this case, the same results are obtained even when the track-pitch ratio is made narrower by 0.6%.

Figure 7:
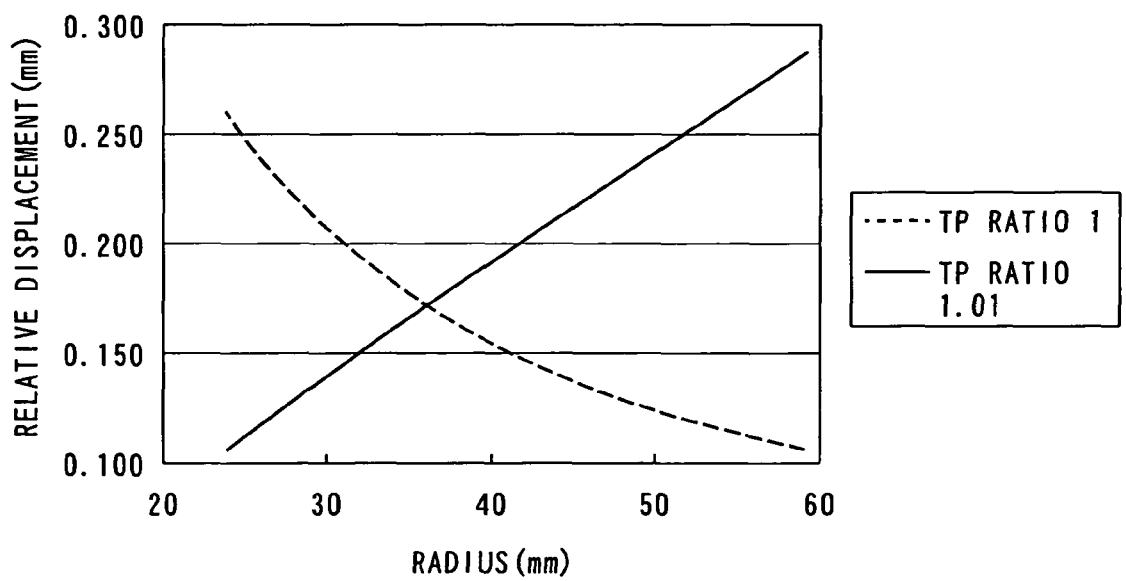
FIG. 7 is a graph showing deviation in the relative-positional relationship between a first and second recording layer at a certain track pitch ratio and radius in a second embodiment of the invention.

FIG. 7 shows the case of an offset amount of 105 μm at a position where the radius r is 24 mm, and where a difference in track-pitch ratio of 1% is applied. From FIG. 7 it can be seen that when comparing the case shown by the dashed line where the track-pitch ratio (TP1/TP2) is not changed with the case shown by the solid line where the track-pitch ratio of the second recording layer L1 with respect to the first recording layer L0 is made narrower by 1%, in the case where the track-pitch ratio has been made narrower by 1%, the relative displacement on the outer side becomes large at about 180 μm, and it is possible to reduce the deviation in the relative positional relationship between an address and radius on the first recording layer L0 and second recording layer L1.

With the embodiment described above, information is recorded on the first recording layer L0 and second recording layer L1 at constant linear velocity, and an address on the second recording layer L1 that corresponds to the same address on the first recording layer L0 is offset in the range of 105 to 116 μm further toward the inside than the address on the first recording layer L0, and by making the track pitch TP1 on the first recording layer L0 narrower than the track pitch TP2 on the second recording layer L1 by 0.1 to 0.6%, it is possible to reduce the deviation in the relative positional relationship between an address and radius on the first recording layer L0 and second recording layer L1. Particularly, it is made clear that when the offset amount is 116 μm, and the track-pitch ratio of the second recording layer L1 with respect to the first recording layer L0 is made narrower by 0.28%, it is possible to greatly reduce the deviation in the relative positional relationship between an address and radius on the first recording layer L0 and second recording layer L1.

When the ratio of the track pitch TP2 on the second recording layer L1 with respect to the track pitch TP1 on the first recording layer L0 is made narrower by 0.1 or less, then similar to the case when the track-pitch ratio is not changed, the relative displacement on the inner side exceeds 200 μm, and it is not possible to reduce the deviation in the relative positional relationship between an address and radius on the first recording layer L0 and second recording layer L1.

Moreover, when the ratio of the track pitch TP2 on the second recording layer L1 with respect to the track pitch TP1 on the first recording layer L0 is made narrower by 0.6 or greater, opposite that of the case when the track-pitch ratio is not changed, the relative displacement on the outer side increases to greater than 280 μm, and it is not possible to reduce the deviation in the relative positional relationship between an address and radius on the first recording layer L0 and second recording layer L1.

Example of Application to an Information-Recording/Reproduction Apparatus

Next, it is also possible to record information on or reproduce information from the optical-recording medium constructed as described above using an information-recording/reproduction apparatus as shown in FIG. 3. In other words, the information-recording/reproduction apparatus is an apparatus that, according to control from a controller 24, is capable of recording information on the optical disc 10, and reading information that has been recorded on the optical disc 10.

The invention is not limited to the embodiment described above, and various changes are possible. For example, the optical disc 10 of this invention is not limited to two layers on one surface, or in other words, a dual-layer disc, and it possible for the optical disc 10 to have two layers on both surfaces, or in other words, a dual-layer double-sided disc. Also, the invention is not limited to an optical disc having two recording layers as described above, and the optical disc could also be a multi-layer disc having three or more layers. In the case of three or more layers, the track-pitch ratio is set according to the amount of offset of the respective layers. As a result, it is possible to increase the applicable range for applying the present invention to an optical disc. Also, the invention can be applied to a large-capacity recording medium such as a disc that is uses a blue laser in recording or reproduction.

It should be understood that various alternatives to the embodiment of the invention described herein may be employed in practicing the invention. Thus, it is intended that the following claims define the scope of the invention and that methods and structures within the scope of these claims and their equivalents be covered thereby.

The entire disclosure of Japanese Patent Application No. 2005-089012 filed on Mar. 25, 2005 and No. 2005-089013 filed on Mar. 25, 2005 including the specification, claims, drawings and summary are incorporated herein by reference in its entirety.

What is claimed is:

1. An optical-recording medium comprising:

at least a first recording layer for recording information optically; and a second recording layer for recording said information optically by a light beam that passes through said first recording layer;

wherein when said information is recorded on said first recording layer and second recording layer at a constant linear velocity, and a same address position of said first recording layer and said second recording layer are such that the same address position on said second recording layer is relatively offset so it is further inside than the same address position on said first recording layer, the track pitch of a recording track formed on said second recording layer is narrower than the track pitch of a recording track formed on said first recording layer so that the overall offset value in the radial direction is a predetermined value or less; and wherein when said predetermined value range is 200 μm or less, the track pitch of said second recording layer is narrower than the track pitch of said first recording layer by the range of 0.1% to 0.6%.

2. The optical-recording medium of claim 1, wherein when an address position on said second recording layer that corresponds to the same address on said first recording layer is offset further inside than the position on said first recording layer within a range or 105 to 116 μm, the track pitch of said second recording layer is narrower than the track pitch of said first recording layer by 0.28%.

* * * * *